Figure 1:
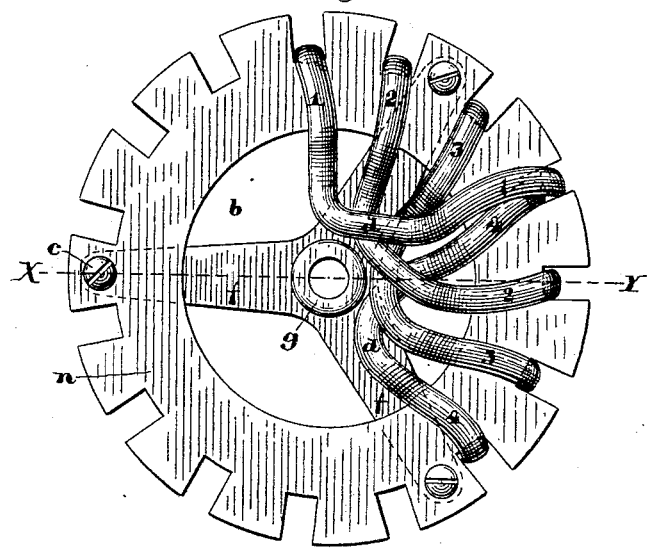

(No Model.)

R. H. HASSLER.
ARMATURE FOR ELECTRIC MOTORS.

No. 493,025. Patented Mar. 7, 1893.

Witnesses:
J. Alfred Tucker.
F. W. Hanitch.

Inventor:
Robert H. Hassler.

UNITED STATES PATENT OFFICE.

ROBERT H. HASSLER, OF DAYTON, OHIO.

ARMATURE FOR ELECTRIC MOTORS.

SPECIFICATION forming part of Letters Patent No. 493,025, dated March 7, 1893.

Application filed August 15, 1892. Serial No. 443,182. (No model.)

*To all whom it may concern:*

Be it known that I, ROBERT H. HASSLER, a citizen of the United States, residing at Dayton, county of Montgomery, and State of Ohio, have invented certain new and useful Improvements in Armatures, of which the following is a specification.

My invention relates particularly to armatures for electric motors, used to drive ventilating fans. In these fans, an electric motor is suspended from the ceiling, and the fan blades are attached directly to the shaft of the motor. In the every day use of these fans, it frequently happens that the blades strike some obstruction, and are thus accidentally prevented from rotating, while the full pressure of the current is on the motor. The counter electro-motive force, of the motor being reduced to zero, by the stoppage of the armature, an increased rush of current ensues, which with the usual forms of construction would burn out the armature.

The object of my invention is, to so construct the armature, that it will not be injured by this increase of current, above the normal, and to provide convenient means for supporting the armature on the shaft, and for securely fastening the coils to the core.

I construct the armature core and wind the conducting wires on it, in such a way, that the conductors, or coils of wire shall have an unusual and excessive radiating surface, which prevents their over-heating.

The accompanying drawings, show the method as applied to an armature with teeth, having the coils contained in slots between the teeth, but my invention is equally applicable to armatures with smooth cores, without teeth.

Referring to the accompanying drawings Figure (1) is an end view of the armature, in process of construction, with coils of conducting wires, 1, 2, 3, and 4, in position. Fig. (2) is a cross-sectional view of the completed armature through the line $x-y$ of Fig. (1) with the coils all in proper position. Fig. (3) is a view of one of the armature coils in the form it would have after being placed in position on the armature core.

The coils shown in these drawings, are intended for use with a four (4) pole field magnet, but my method of construction may be used for any number of poles on the field magnet.

It will be seen that this armature is of the drum type, with its diameter exceeding its length, being built up of iron plates or rings $n$ and having its magnetic material contained near its circumference, thus leaving a cylindrical space $b$ in the interior of the core, as shown in Fig. (1). The coils of conducting wires are first wound in any suitable form, and then placed upon the armature, and bent into the form shown in Fig. 3. The cylindrical space $b$ in the interior of the core, will then be occupied and somewhat filled by the flanks or parts $d$ of the coils.

Figure 3:
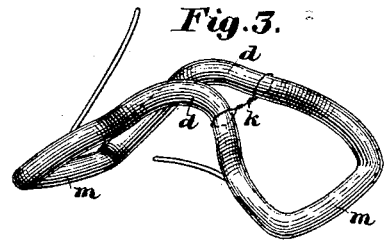

In Fig. 3, $m$ $m$ are the parts of the coils which fit into the slots on the exterior of the armature, and $d$ $d$ are the parts which lie at the ends of the armature, and partly fill the interior cavity $b$.

On the usual forms of drum armatures, the coils of wire are wound very closely and compactly about the end of the core, to economize space, but in the form of armature herein shown the flanks or parts $d$ of the different coils may be somewhat separated from each other in the cylindrical cavity $b$ without increasing the length of the armature. The flanks or portions $d$ of the coils being thus rather loosely pressed down into the space $b$ it is seen that the air may circulate freely through the cavity $b$ coming into direct contact with the coils, for a large part of their length.

I give the spider supporting the armature to the shaft, a form and position which this method of winding coils, makes very convenient. This spider consists of a central hub $g$ with flat spokes or arms, $f$ passing between the plates or rings of the coil to which it is fastened by the bolts $c$. It will be seen that the spokes or arms $f$ divide the plates of the armature core, into two equal parts. This form of spider leaves the ends of the armature core perfectly free and open for the introduction of the coils into the space $b$. It will also be seen that the introduction of the spokes $f$ between the plates of the core, produces a slot or channel around the exterior circumference of the armature, thus providing means for firmly fastening the parts $m$ of the coils to the exterior of the armature by means of a cord $l$ passing through this slot. I bind and fasten the coils to the armature in a manner made possible by this form of construction.

Figure 2:
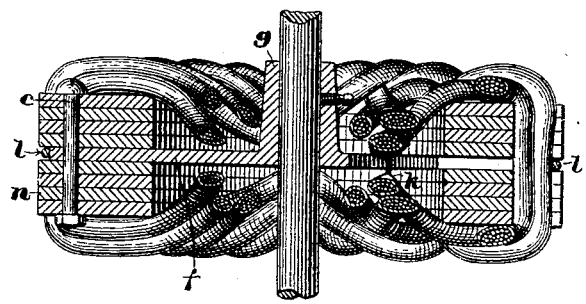

In Figs. 2 and 3, will be seen the cord or tape $k$ which serves to pull the parts $d\ d$ of the coils toward each other, thus drawing them into the space $b$ as well as fastening the coils to the core.

Having thus described my invention, what I claim is—

1. An armature core, having its magnetic material forming an annular band or ring, leaving an interior cylindrical cavity running the entire length of the armature, in combination with coils placed upon the core, in such a way, that the said interior cavity will be occupied and approximately filled by the flanks of the coils, said coils passing into and out of said cavity at the same end of the armature.

2. An armature core having its magnetic material forming an annular band or ring, leaving an interior cavity running the entire length of the armature, with coils placed upon the core in such a way that the said interior cavity will be occupied and approximately filled by the flanks of the coils; said coils passing into, and out of said cavity, at the same end of the armature, in combination with a supporting piece or spider, placed midway between the two ends of the armature core, substantially, as described.

3. An armature core having its magnetic material forming an annular band or ring, leaving an interior cylindrical cavity, running the entire length of the armature, with coils placed upon the core in such a way that the said interior cavity will be occupied and approximately filled by the flanks of the coils, said coils passing into and out of, said cavity at the same end of the armature, with a supporting spider, placed mid-way between the two ends of the armature core, substantially as described, thus forming a channel around the outside of the armature, in combination with a binding cord or wire, contained in said channel holding the coils to the core.

4. An armature core, having its magnetic material forming an annular band or ring, leaving an interior cylindrical cavity running the entire length of the armature, with coils placed upon the core in such a way that the said interior cavity, will be occupied and approximately filled by the flanks, of the coils, said coils passing into and out of, said cavity at the same end of the armature in combination with binding cords, wires or tapes, passing through the interior cavity in a direction approximately parallel to the shaft, said cords, binding and fastening the coils to the core, and holding said coils with-in the interior cavity.

ROBERT H. HASSLER.

Witnesses:
B. W. LEWIS,
E. D. HYRE.